(12) United States Patent
Umetsu

(10) Patent No.: US 11,472,396 B2
(45) Date of Patent: Oct. 18, 2022

(54) VEHICLE CONTROL METHOD, VEHICLE SYSTEM AND VEHICLE CONTROL DEVICE

(71) Applicant: MAZDA MOTOR CORPORATION, Hiroshima (JP)

(72) Inventor: Daisuke Umetsu, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 267 days.

(21) Appl. No.: 16/970,108

(22) PCT Filed: Feb. 19, 2019

(86) PCT No.: PCT/JP2019/006070
§ 371 (c)(1),
(2) Date: Aug. 14, 2020

(87) PCT Pub. No.: WO2019/160158
PCT Pub. Date: Aug. 22, 2019

(65) Prior Publication Data
US 2020/0406883 A1 Dec. 31, 2020

(30) Foreign Application Priority Data
Feb. 19, 2018 (JP) .............................. JP2018-026775

(51) Int. Cl.
*B60W 10/196* (2012.01)
*B60W 30/045* (2012.01)
*B60W 40/13* (2012.01)

(52) U.S. Cl.
CPC ........ *B60W 10/196* (2013.01); *B60W 30/045* (2013.01); *B60W 2040/1307* (2013.01);
(Continued)

(58) Field of Classification Search
CPC ............. B60W 10/196; B60W 30/045; B60W 2040/1307; B60W 2520/105; B60W 2710/0666
See application file for complete search history.

(56) References Cited

U.S. PATENT DOCUMENTS

2005/0206233 A1   9/2005   Offerle et al.
2015/0239442 A1   8/2015   Yamakado et al.
(Continued)

FOREIGN PATENT DOCUMENTS

EP    2905193 A1    8/2015
JP    2006256455 A  9/2006
(Continued)

OTHER PUBLICATIONS

The extended European search report issued by the European Patent Office dated Feb. 12, 2021, which corresponds to European Patent Application No. 19754256.6-1012 and is related to U.S. Appl. No. 16/970,108.
(Continued)

*Primary Examiner* — Peter D Nolan
*Assistant Examiner* — Mikko Okechukwu Obioha
(74) *Attorney, Agent, or Firm* — Studebaker & Brackett PC

(57) ABSTRACT

Disclosed is a vehicle control method which comprises the steps of: determining whether or not a squat of a rear end of a vehicle body is equal to or greater than a given level; determining whether or not turning manipulation of a steering device has been made; and, when the turning manipulation of the steering device is determined to have been made, controlling each part of an engine (4) to reduce an output torque of the engine (4), wherein, in response to the determination that the turning manipulation of the steering device has been made, a reduction amount of the output
(Continued)

torque of the engine is increased when the squat of the rear end of the vehicle body is equal to or greater than the given level, as compared to when the squat is less than the given level.

9 Claims, 13 Drawing Sheets

(52) U.S. Cl.
CPC .............. *B60W 2520/105* (2013.01); *B60W 2710/0666* (2013.01)

(56) References Cited

U.S. PATENT DOCUMENTS

| | | |
|---|---|---|
| 2016/0244038 A1 | 8/2016 | Yamakado et al. |
| 2017/0129480 A1 | 5/2017 | Sunahara et al. |
| 2017/0183000 A1 | 6/2017 | Yamakado et al. |

FOREIGN PATENT DOCUMENTS

| | | |
|---|---|---|
| JP | 2016107953 A | 6/2016 |
| JP | 2017087888 A | 5/2017 |
| JP | 6229879 B2 | 11/2017 |

OTHER PUBLICATIONS

International Search Report issued in PCT/JP2019/006070; dated Apr. 9, 2019.
Written Opinion issued in PCT/JP2019/006070; dated Apr. 9, 2019.

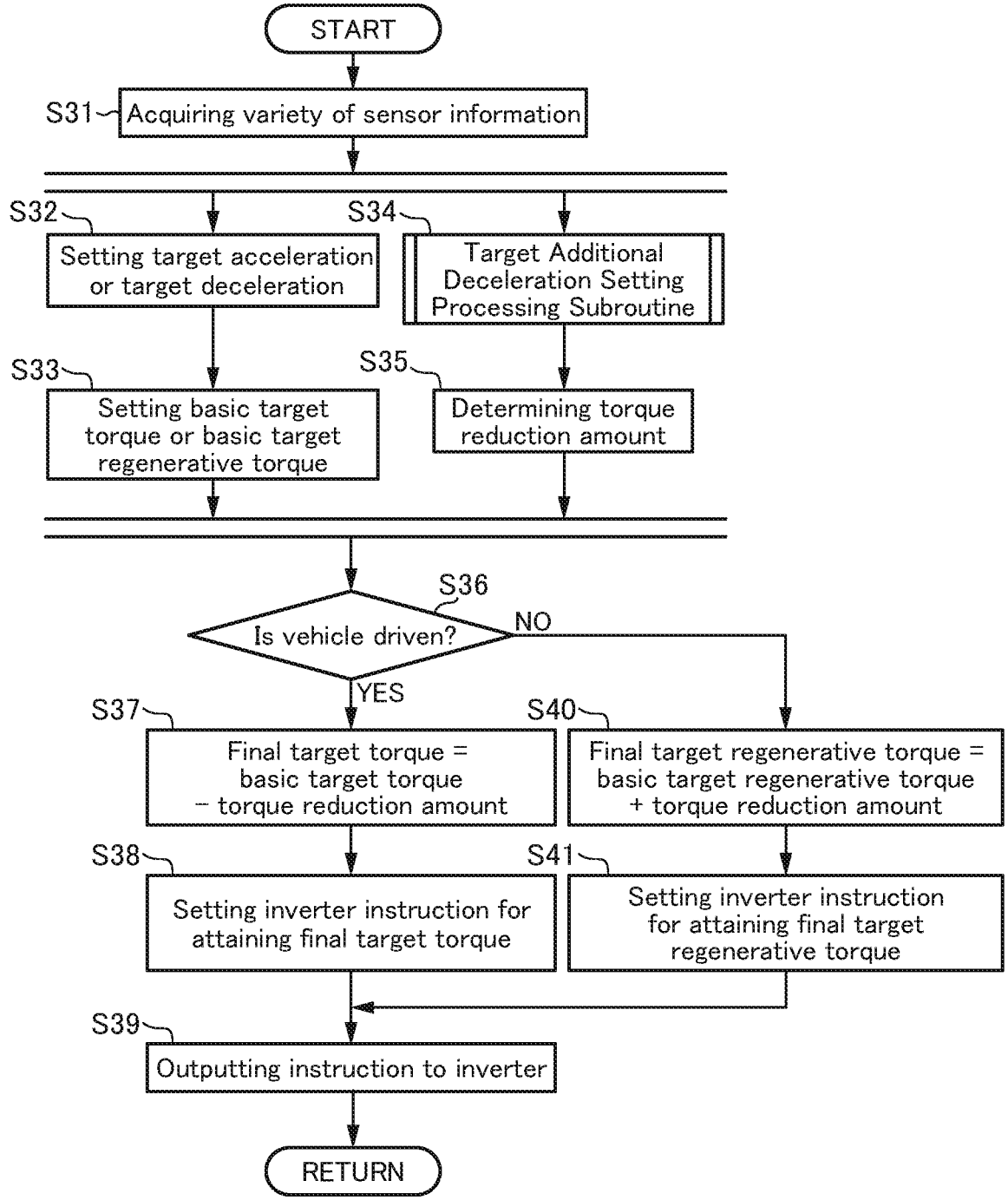

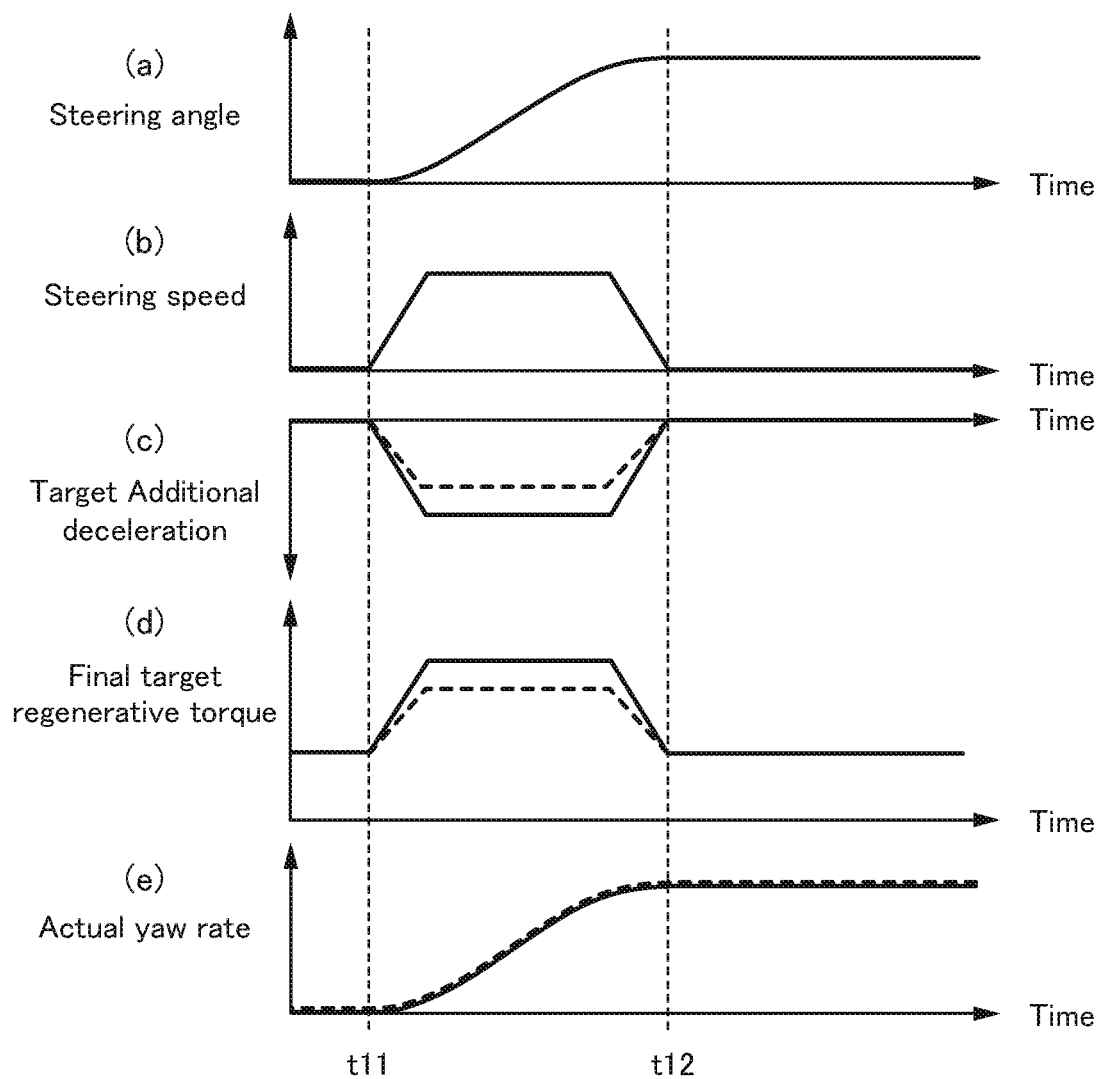

VEHICLE CONTROL METHOD, VEHICLE SYSTEM AND VEHICLE CONTROL DEVICE

TECHNICAL FIELD

The present invention relates to a vehicle control method, a vehicle system and a vehicle control device for executing control of adding a deceleration to a vehicle in a given situation.

BACKGROUND ART

Heretofore, there has been known a technique of, in a situation where the behavior of a vehicle becomes unstable due to road wheel slip or the like, controlling the vehicle behavior to enable a safe traveling (e.g., an antiskid brake system). Specifically, there has been known a control device operable to detect the occurrence of vehicle understeer or oversteer behavior during vehicle cornering or the like, and apply an appropriate deceleration to one or more road wheels so as to suppress such a behavior.

As a different type of control from the above control for improving safety in a traveling condition causing the vehicle behavior to become unstable, there has been known a vehicle motion control device operable to adjust deceleration during vehicle cornering and thereby adjust a load to be applied to front road wheels as steerable road wheels, so as to allow a series of driver's manipulations (braking, turning of a steering wheel, accelerating, turning-back of the steering wheel, etc.) during vehicle cornering under a normal traveling condition to be attained naturally and stably.

Further, there has been proposed a vehicle behavior control device operable to reduce an output torque of an engine (torque to be generated by the engine) according to a yaw rate-related quantity (e.g., yaw acceleration) corresponding to manipulation of a steering wheel by a driver, thereby making it possible to quickly generate a deceleration in a vehicle in response to start of the steering wheel manipulation by the driver and thus quickly apply a sufficient load to front road wheels as steerable road wheels (see, e.g., the following Patent Document 1). In this vehicle behavior control device, in response to start of the steering wheel manipulation, a load is quickly applied to the front road wheels to cause an increase in frictional force between each of the front road wheels and a road surface and thus an increase in cornering force of the front road wheels, thereby improving turn-in ability of the vehicle in an initial phase after entering a curve, and improving responsiveness to a turning manipulation of the steering wheel (i.e., steering stability). This makes it possible to attain control of vehicle attitude conforming to the intention of the driver. Such control will hereinafter be referred to appropriately as "vehicle attitude control".

CITATION LIST

[Patent Document]

Patent Document 1: JP 6229879B

SUMMARY OF INVENTION

Technical Problem

Meanwhile, in a situation where a vehicle is towing a trailer coupled to a rear end of a vehicle body thereof, or is loaded with a heavy object on the rear end of the vehicle body, a rear suspension is contracted due to the trailer or the loaded object, and thereby the rear end of the vehicle body sinks or squats down with respect to a front end of the vehicle body. If the above vehicle attitude control is executed to generate a deceleration in the vehicle according to turning manipulation of a steering wheel, in a situation where such a rear-end squat of the vehicle body occurs, a squat of the front end of the vehicle body to be caused by the deceleration is suppressed due to the already-occurred rear-end squat of the vehicle body, so that there is a possibility of failing to attain desired vehicle attitude control.

The present invention has been made to solve the above conventional problem, and an object thereof is to, in a vehicle control method, a vehicle system and a vehicle control device for executing, upon turning manipulation of a steering device, control of adding a deceleration to a vehicle so as to control the attitude of a vehicle, attain desired vehicle attitude control even in a situation where a rear end of a vehicle body of the vehicle squats down with respect to a front end of the vehicle body due to the weight of a trailer or a loaded object.

Solution to Technical Problem

In order to achieve the above object, according to the present invention, there is provided a vehicle control method for a vehicle equipped with a drive source to generate an output torque for driving drive road wheels, an output torque control mechanism to control the output torque of the drive source, a steering angle sensor to detect a steering angle of a steering device, and a suspension device having an elastic member, the vehicle control method comprising the steps of: determining whether or not a squat of a rear end of a vehicle body of the vehicle is equal to or greater than a given level; determining whether or not turning manipulation of the steering device has been performed, based on the steering angle detected by the steering angle sensor; and controlling the output torque control mechanism to reduce the output torque of the drive source, when the turning manipulation of the steering device is determined to have been performed, wherein, when the squat of the rear end of the vehicle body is equal to or greater than the given level, the step of controlling the output torque control mechanism to reduce the output torque of the drive source further comprises making a reduction amount of the output torque larger than when the squat is less than the given level. In the vehicle control method according to the above present invention, in response to the determination that the turning manipulation of the steering device has been made, the reduction amount of the output torque of the drive source is increased when the squat of the rear end of the vehicle body is equal to or greater than the given level, as compared to when the squat is less than the given level, so that a pitching moment oriented to cause a front end of the vehicle body to squat down when adding a deceleration to the vehicle can be increased when the squat of the rear end of the vehicle body is equal to or greater than the given level, as compared to when the squat is less than the given level. Thus, even in a situation where the rear end of the vehicle body squats down with respect to the front end of the vehicle body due to the weight of a trailer or a loaded object, and thereby pitching of the vehicle body is suppressed, it is possible to overcome insufficient squat of the front end of the vehicle body when adding a deceleration to the vehicle based on reduction of the output torque of the drive source, thereby obtaining desired vehicle turning performance.

In order to achieve the above object, according to another aspect of the present invention, there is provided a vehicle control method for a vehicle equipped with a braking device to apply a braking force to road wheels, a steering angle sensor to detect a steering angle of a steering device, and a suspension device having an elastic member, the vehicle control method comprising the steps of: determining whether or not a squat of a rear end of a vehicle body of the vehicle is equal to or greater than a given level; determining whether or not turning manipulation of the steering device has been performed, based on the steering angle detected by the steering angle sensor; and causing the braking device to generate the braking force, when the turning manipulation of the steering device is determined to have been performed, wherein, when the squat of the rear end of the vehicle body is equal to or greater than the given level, the step of causing the braking device to generate the braking force further comprises making the braking force larger than when the squat is less than the given level.

In the vehicle control method according to the above present invention, in response to the determination that the turning manipulation of the steering device has been made, the braking force to be generated by the braking device is increased when the squat of the rear end of the vehicle body is equal to or greater than the given level, as compared to when the squat is less than the given level, so that the pitching moment oriented to cause the front end of the vehicle body to squat down when adding a deceleration to the vehicle can be increased when the squat of the rear end of the vehicle body is equal to or greater than the given level, as compared to when the squat is less than the given level. Thus, even in the situation where the rear end of the vehicle body squats down with respect to the front end of the vehicle body due to the weight of a trailer or a loaded object, and thereby pitching of the vehicle body is suppressed, it is possible to overcome insufficient squat of the front end of the vehicle body when adding a deceleration to the vehicle based on the braking force of the braking device, thereby obtaining desired vehicle turning performance.

In order to achieve the above object, according to another aspect of the present invention, there is provided a vehicle control method for a vehicle equipped with a generator to perform regenerative power generation while being driven by road wheels, a steering angle sensor to detect a steering angle of a steering device, and a suspension device having an elastic member, the vehicle control method comprising the steps of: determining whether or not a squat of a rear end of a vehicle body of the vehicle is equal to or greater than a given level; determining whether or not turning manipulation of the steering device has been performed, based on the steering angle detected by the steering angle sensor; and causing the generator to perform the regenerative power generation, when the turning manipulation of the steering device is determined to have been performed, wherein, when the squat of the rear end of the vehicle body is equal to or greater than the given level, the step of causing the generator to perform the regenerative power generation further comprises making an amount of regenerative power larger than when the squat is less than the given level.

In the vehicle control method according to the above present invention, in response to the determination that the turning manipulation of the steering device has been made, the amount of regenerative power to be generated by the generator is increased when the squat of the rear end of the vehicle body is equal to or greater than the given level, as compared to when the squat is less than the given level, so that the pitching moment oriented to cause the front end of the vehicle body to squat down when adding a deceleration to the vehicle can be increased when the squat of the rear end of the vehicle body is equal to or greater than the given level, as compared to when the squat is less than the given level. Thus, even in the situation where the rear end of the vehicle body squats down with respect to the front end of the vehicle body due to the weight of a trailer or a loaded object, and thereby pitching of the vehicle body is suppressed, it is possible to overcome insufficient squat of the front end of the vehicle body when adding a deceleration to the vehicle based on the regenerative power generation by the generator, thereby obtaining desired vehicle turning performance.

Preferably, in the vehicle control method according to the above present invention, in the step of determining whether or not the squat of the rear end is equal to or greater than the given level, the squat is determined to be equal to or greater than the given level, when it is detected that the vehicle is performing towing.

According to this feature, even in a situation where the vehicle is towing a trailer (is in a trailer towing state), and thus a vertical load is applied from the trailer to the rear end of the vehicle body through a hitch to cause the rear end of the vehicle body to squat down with respect to the front end of the vehicle body at a given level or more, it is possible to overcome insufficient squat of the front end of the vehicle body when adding a deceleration to the vehicle, thereby obtaining desired vehicle turning performance.

Preferably, in the vehicle control method according to the above present invention, in the step of determining whether or not the squat of the rear end is equal to or greater than the given level, the squat is determined to be equal to or greater than the given level, when a load at the rear end of the vehicle body is equal to or greater than a given value.

According to this feature, even in a situation where a vertical load is applied from a heavy object loaded on the vehicle to the rear end of the vehicle body and thereby the rear end of the vehicle body squats down with respect to the front end of the vehicle body at a given level or more, it is possible to overcome insufficient squat of the front end of the vehicle body when adding a deceleration to the vehicle, thereby obtaining desired vehicle turning performance.

In order to achieve the above object, according to still another aspect of the present invention, there is provided a vehicle system for controlling a vehicle, comprising: a drive source to generate an output torque for driving drive road wheels; an output torque control mechanism to control the output torque of the drive source; a steering angle sensor to detect a steering angle of a steering device; a suspension device having an elastic member; and a processor, wherein the processor is configured to: determine whether or not a squat of a rear end of a vehicle body of the vehicle is equal to or greater than a given level; determine whether or not turning manipulation of the steering device has been performed, based on the steering angle detected by the steering angle sensor; and control the output torque control mechanism to reduce the output torque of the drive source, when the turning manipulation of the steering device is determined to have been performed, wherein, when the squat of the rear end of the vehicle body is equal to or greater than the given level, the processor is further configured to make a reduction amount of the output torque larger than when the squat is less than the given level.

In the vehicle system according to the above present invention, even in the situation where the rear end of the vehicle body squats down with respect to the front end of the vehicle body due to the weight of a trailer or a loaded object during the vehicle attitude control, it is possible to attain desired vehicle attitude control.

In order to achieve the above object, according to still another aspect of the present invention, there is provided a vehicle system for controlling a vehicle, comprising: a braking device to apply a braking force to road wheels; a steering angle sensor to detect a steering angle of a steering device; a suspension device having an elastic member; and a processor, wherein the processor is configured to: determine whether or not a squat of a rear end of a vehicle body of the vehicle is equal to or greater than a given level; determine whether or not turning manipulation of the steering device has been performed, based on the steering angle detected by the steering angle sensor; and cause the braking device to generate the braking force, when the turning manipulation of the steering device is determined to have been performed, wherein, when the squat of the rear end of the vehicle body is equal to or greater than the given level, the processor is further configured to make the braking force larger than when the squat is less than the given level.

In the vehicle system according to the above present invention, even in the situation where the rear end of the vehicle body squats down with respect to the front end of the vehicle body due to the weight of a trailer or a loaded object during the vehicle attitude control, it is possible to attain desired vehicle attitude control.

In order to achieve the above object, according to still another aspect of the present invention, there is provided a vehicle system for controlling a vehicle, comprising: a generator to perform regenerative power generation while being driven by road wheels; a steering angle sensor to detect a steering angle of a steering device; a suspension device having an elastic member: and a processor, wherein the processor is configured to: determine whether or not a squat of a rear end of a vehicle body of the vehicle is equal to or greater than a given level; determine whether or not turning manipulation of the steering device has been performed, based on the steering angle detected by the steering angle sensor; and cause the generator to perform the regenerative power generation, when the turning manipulation of the steering device is determined to have been performed, wherein, when the squat of the rear end of the vehicle body is equal to or greater than the given level, the processor is further configured to make an amount of regenerative power larger than when the squat is less than the given level.

In the vehicle system according to the above present invention, even in the situation where the rear end of the vehicle body squats down with respect to the front end of the vehicle body due to the weight of a trailer or a loaded object during the vehicle attitude control, it is possible to attain desired vehicle attitude control.

In order to achieve the above object, according to still another aspect of the present invention, there is provided a vehicle control device for a vehicle equipped with a suspension device having an elastic member, comprising, a deceleration addition means for adding a deceleration to the vehicle so as to control an attitude of the vehicle, when turning manipulation of a steering device is determined to have been performed, wherein, when a squat of a rear end of a vehicle body of the vehicle is equal to or greater than a given level, the deceleration addition means is configured to make the deceleration to be added to the vehicle larger than when the squat is less than the given level.

In the vehicle control device according to the above present invention, even in the situation where the rear end of the vehicle body squats down with respect to the front end of the vehicle body due to the weight of a trailer or a loaded object during the vehicle attitude control, it is possible to attain desired vehicle attitude control.

In order to achieve the above object, according to still another aspect of the present invention, there is provided a vehicle control device for a vehicle equipped with a suspension device having an elastic member, comprising, a deceleration addition means for adding a deceleration to the vehicle so as to control an attitude of the vehicle, when turning manipulation of a steering device is determined to have been performed, wherein, when the vehicle is performing towing, the deceleration addition means is configured to make the deceleration to be added to the vehicle larger than when the vehicle is not performing the towing.

In the vehicle control device according to the above present invention, even in the situation where the rear end of the vehicle body squats down with respect to the front end of the vehicle body due to the weight of a trailer or a loaded object during the vehicle attitude control, it is possible to attain desired vehicle attitude control.

Effect of Invention

The vehicle control method, the vehicle system and the vehicle control device of the present invention for executing, upon turning manipulation of a steering device, control of adding a deceleration to a vehicle so as to control the attitude of a vehicle can attain desired vehicle attitude control, even in the situation where the rear end of the vehicle body squats down with respect to the front end of the vehicle body due to the weight of a trailer or a loaded object.

BRIEF DESCRIPTION OF DRAWINGS

FIG. 12 is a flowchart of a vehicle attitude control processing routine in the second modified embodiment.

FIG. 13 illustrates time charts each showing a temporal change in a respective one of various parameters regarding the vehicle attitude control, in a situation where a vehicle equipped with the vehicle control device according to the second modified embodiment is turning.

DESCRIPTION OF EMBODIMENTS

With reference to the accompanying drawings, a vehicle control device according one embodiment of the present invention will now be described.

Figure 1:
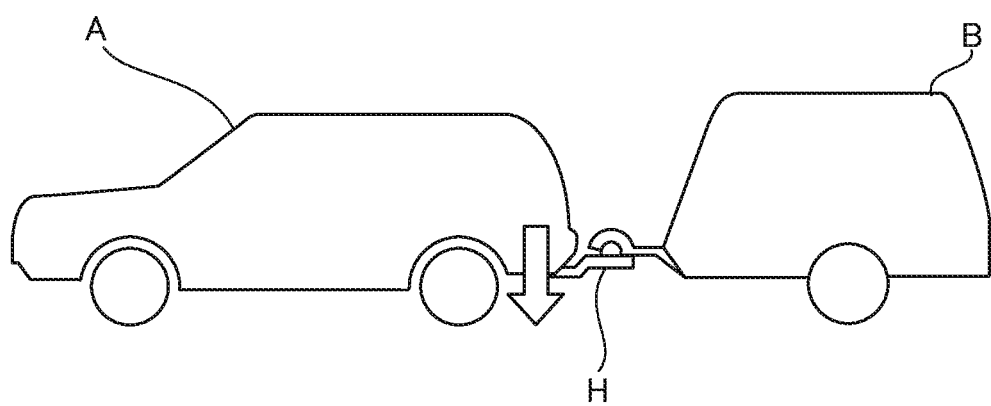
FIG. 1 is a schematic side view showing a vehicle towing a trailer.

First of all, a sinking or squat of a rear end of a vehicle body of a vehicle occurring when the vehicle is towing a trailer will be described based on FIG. 1. FIG. 1 is a schematic side view showing a vehicle towing a trailer.

As shown in FIG. 1, a trailer B is coupled to a rear end of a towing vehicle A through a coupler or hitch H. In order to ensure traveling stability during towing, the position of the center of gravity of the trailer B is located forward of an axle thereof to allow an adequate vertical load (e.g., 10% to 20% of a total weight of the trailer B) to be applied to the hitch H. Thus, a force acting to push the rear end of the vehicle body of the towing vehicle A downwardly (in a direction indicated by the arrowed line in FIG. 1) through the hitch H arises during towing, so that a rear suspension device is contracted to cause the rear end of the vehicle body to squat down with respect to a front end of the vehicle body.

Assume that the towing vehicle A is decelerated in the state in which the rear end of the vehicle body thereof squats down as just described. In this case, although a pitching moment oriented to cause the front end of the vehicle body of the towing vehicle A to squat arises, pitching of the vehicle body of the towing vehicle A is suppressed by the vertical load applied from the trailer B to the rear end of the vehicle body through the hitch H, and thus the squat of the front end of the vehicle body is also suppressed. That is, a squat of a front end of a vehicle body of a vehicle to be caused when the vehicle is decelerated in a trailer towing state is less than a squat of the front end of the vehicle body to be caused when the vehicle is decelerated in a non-trailer towing state. Therefore, when adding a deceleration to a vehicle in the trailer towing state to cause a front end of a vehicle body of the vehicle to squat down at the same level as that in the non-trailer towing state, the deceleration needs to be greater than that to be added in the non-trailer towing state.

Figure 2:
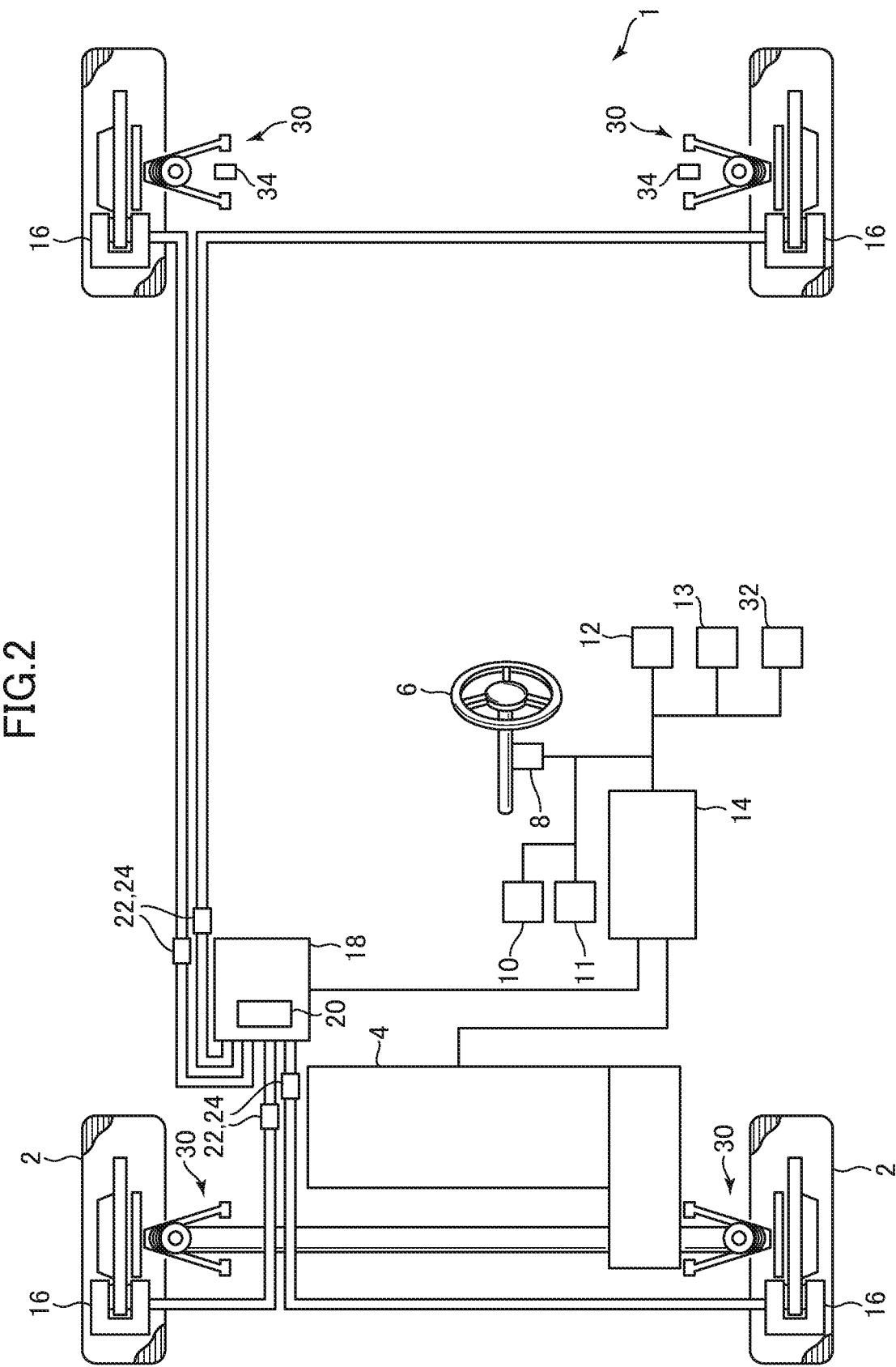
FIG. 2 is a block diagram showing the overall configuration of a vehicle equipped with a vehicle control device according to one embodiment of the present invention.

Next, with reference to FIG. 2, a system configuration of a vehicle equipped with the vehicle control device according to this embodiment will be described. FIG. 2 is a block diagram showing the overall configuration of the vehicle equipped with the vehicle control device according to this embodiment.

In FIG. 1, the reference sign 1 denotes the vehicle equipped with the vehicle control device according to this embodiment. A vehicle body of the vehicle 1 has a front portion on which an engine 4 serving as a drive source for driving drive road wheels (in the example of FIG. 1, right and left front road wheels 2) is mounted. The engine 4 is an internal combustion engine such as a gasoline engine or a diesel engine. In this embodiment, the engine 4 is a gasoline engine having a spark plug.

The vehicle 1 is equipped with: a steering device (steering wheel 6, etc.) for steering the vehicle 1; a steering angle sensor 8 installed in this steering device to detect a rotational angle (steering angle) of a steering shaft (not shown) coupled to the steering wheel 6; an accelerator position sensor 10 to detect a depression amount of an accelerator pedal equivalent to a relative position of the accelerator pedal (accelerator position); a brake depression amount sensor 11 to detect a depression amount of a brake pedal; a vehicle speed sensor 12 to detect a vehicle speed; and an acceleration sensor 13 for detecting an acceleration. Each of these sensors is operable to output a detection value to a controller 14. For example, this controller 14 is comprised of a PCM (Power-train Control Module). Further, each of four road wheels of the vehicle 1 is mounted to the vehicle body through a respective one of four suspensions 30 each comprising a spring (elastic member) and a suspension arm.

The vehicle 1 is further equipped with a brake control system 18 to supply a brake hydraulic pressure to a wheel cylinder or a brake caliper of each of four brake units (braking device) 16 installed in the road wheels, respectively. The brake control system 18 comprises a hydraulic pump 20 to produce a brake hydraulic pressure necessary to generate a braking force in each of the brake units 18 installed in the respective road wheels. The hydraulic pump 20 is configured to be driven by electric power supplied from, e.g., a battery, so as to generate a brake hydraulic pressure necessary to generate a braking force in each of the brake units 16, even when the brake pedal is not depressed. The brake control system 18 further comprises four valve units 22 (specifically, solenoid valves) provided, respectively, in four hydraulic pressure supply lines each connected to a respective one of the brake units 16, to control a hydraulic pressure to be supplied from the hydraulic pump 20 to the respective one of the brake units 18. The degree of opening of each of the valve units 22 can be changed, e.g., by adjusting the amount of electric power to be supplied from the battery to each of the valve units 22. The brake control system 18 further comprises four hydraulic pressure sensors 24 each to detect a hydraulic pressure supplied from the hydraulic pump 20 toward a respective one of the brake units 16. Each of the hydraulic pressure sensors 24 is disposed, e.g., at a connection area between each of the valve units 22 and a downstream portion of a corresponding one of the hydraulic pressure supply lines, to detect a hydraulic pressure at the downstream side of each of the valve units 22 and output a detection value to the controller 14.

The brake control system 18 is operable, based on a braking force instruction value input from the controller 14, and detection values from the hydraulic pressure sensors 24, to calculate a hydraulic pressure to be independently supplied to the wheel cylinder or brake caliper in each of the road wheels, and control a pump speed of the hydraulic pump 20 and the degree of opening of each of the valve units 22, according to the calculated hydraulic pressure.

Figure 3:
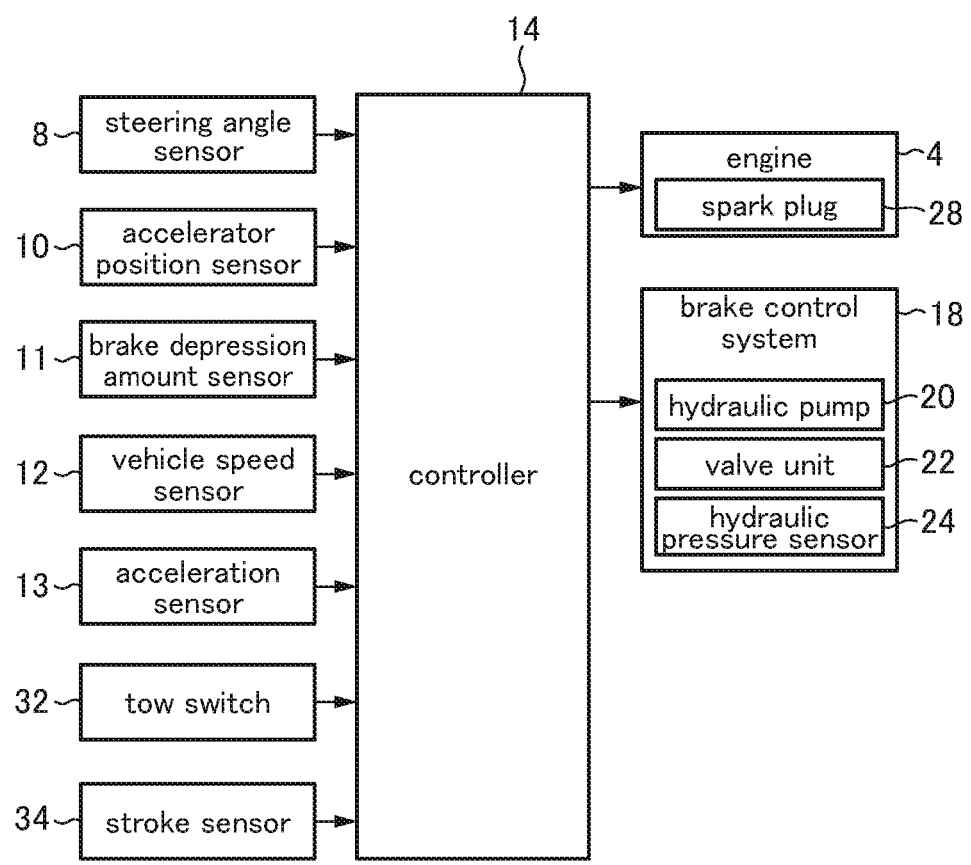
FIG. 3 is a block diagram showing an electrical configuration of the vehicle control device according to this embodiment.

Next, with reference to FIG. 3, an electrical configuration of the vehicle control device according to this embodiment will be described. FIG. 3 is a block diagram showing the electrical configuration of the vehicle control device according to this embodiment.

The controller 14 (vehicle control device) according to this embodiment is operable, based on detection signals from the aforementioned sensors 8, 10, 11, 12, 13 and detection signals output from various other sensors for detecting a driving state of the vehicle 1, to output control signals so as to perform control with respect to various components of the engine 4 functioning as an output torque control mechanism (e.g., a throttle valve, a turbocharger, a variable valve mechanism, an ignition device, a fuel injection valve, and an EGR device), and control with respect to the hydraulic pump 20 and the valve units 22.

Each of the controller 14 and the brake control system 18 is comprised of a computer which comprises: one or more processors; various programs (including a basic control program such as an OS, and an application program capable of being activated on the OS to attain a specific function) to be interpreted and executed by the one or more processors; and an internal memory such as ROM or RAM for storing therein the programs and a variety of data.

The controller 14 is equivalent to "vehicle control device" set forth in the appended claims, although the details thereof will be described later. A combination of the vehicle speed sensor 12, the acceleration sensor 13 and the controller 14 functions as a squat detection device to detect a squat of a rear end of the vehicle body. Further, a combination of the engine 4, the controller 14, the steering angle sensor 8 and the suspensions (suspension device) is equivalent to "vehicle system" set forth in the appended claims.

<Vehicle Attitude Control>

Figure 4:
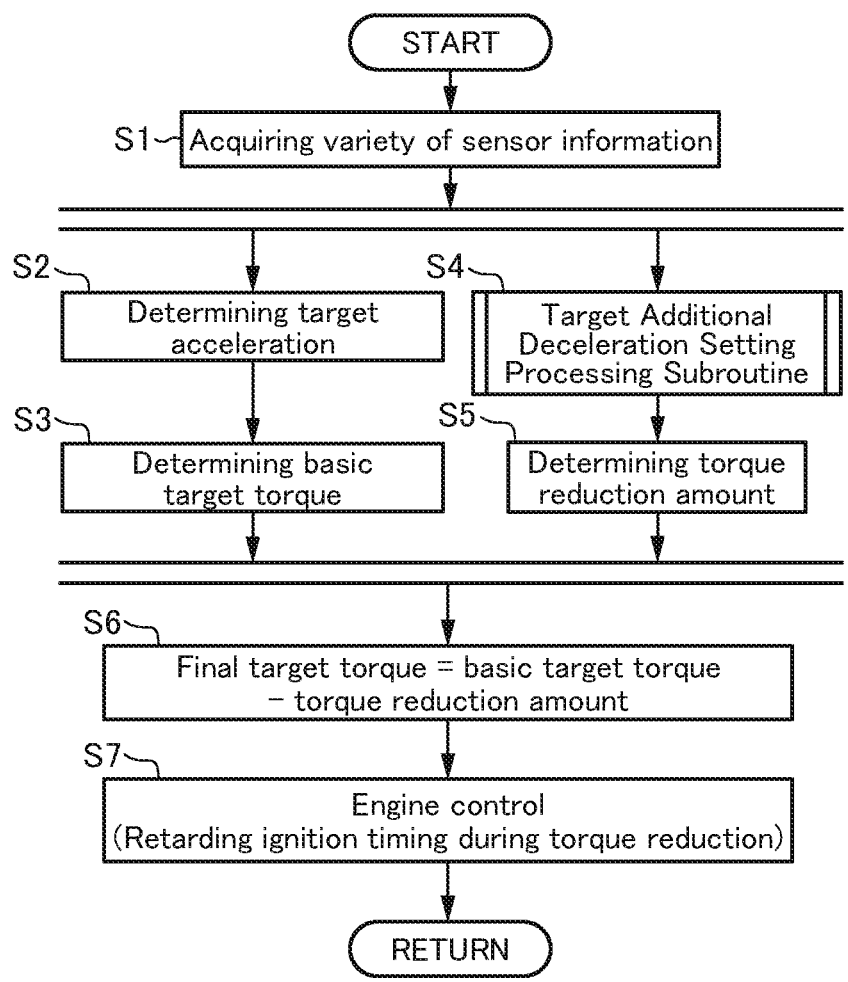
FIG. 4 is a flowchart of a vehicle attitude control processing routine in this embodiment.

Next, the content of specific control to be executed by the vehicle control device will be described. Firstly, with reference to FIG. 4, a general flow of a vehicle attitude control processing routine to be executed by the vehicle control device according to this embodiment will be described. FIG. 4 is a flowchart of the vehicle attitude control processing routine in the vehicle control device according to this embodiment.

The vehicle attitude control processing routine in FIG. 4 is activated when an ignition switch of the vehicle 1 is turned on to apply electric power to the vehicle control device, and repeatedly executed with a given cycle period (e.g., 50 ms).

As shown in FIG. 4, upon start of the vehicle attitude control processing routine, the controller 14 operates, in step S1, to acquire a variety of information regarding the driving state of the vehicle 1. Specifically, the controller 14 operates to acquire, as information regarding the driving state, detection signals output from the aforementioned sensors, including the steering angle detected by the steering angle sensor 8, the accelerator position detected by the accelerator position sensor 10, the vehicle speed detected by the vehicle speed sensor 12, the acceleration detected by the acceleration sensor 13, the hydraulic pressure detected by each of the hydraulic pressure sensors 24, and a currently-set one of plural gear stages of a transmission of the vehicle 1.

Subsequently, the controller 14 operates, in step S2, to set a target acceleration based on the driving state of the vehicle 1 acquired in the step S1. Specifically, the controller 14 operates to select, from a plurality of acceleration characteristic maps defined with respect to various vehicle speeds and various gear stages (these maps are preliminarily created and stored in a memory or the like), one acceleration characteristic map corresponding to a current value of the vehicle speed and a currently-set one of the gear stages, and refer to the selected acceleration characteristic map to determine, as a target acceleration, a value of the acceleration corresponding to a current value of the accelerator position.

Subsequently, the controller 14 operates, in step S3, to determine a basic target torque of the engine 4 required for attaining the target acceleration determined in the step S2. In this process, the controller 14 operates to determine the basic target torque based on current values of the vehicle speed, a road grade, a road surface μ, a currently-set one of the gear stages, etc., within a torque range outputtable by the engine 4.

In parallel to the processings in the steps S2 and S3, the controller 14 operates, in step S4, to execute a target additional deceleration setting processing subroutine to set, based on a steering speed of the steering device, a deceleration to be added to the vehicle 1 to control vehicle attitude (target additional deceleration). The details of the target additional deceleration setting processing subroutine will be described later.

Next, the controller 14 operates, in step S5, to determine a torque reduction amount, based on a target additional deceleration set in the target additional deceleration setting processing subroutine in the step S4. Specifically, the controller 14 operates to determine, based on current values of the vehicle speed and the road grade, a currently-set one of the gear stages, etc., acquired in the step S1, a torque reduction amount necessary to attain the target additional deceleration by means of reduction of an output torque of the engine 4 (torque to be generated by the engine 4).

After completion of the processings in the steps S3 and S5, the controller 14 operates, in step S6, to determine a final target torque, based on the basic target torque determined in the step S3 and the torque reduction amount determined in the step S5. For example, the controller 14 operates to set, as the final target torque, a value obtained by subtracting the torque reduction amount from the basic target torque.

Subsequently, the controller 14 operates, in step S7, to control the engine 4 to output the final target torque set in the step S6. Specifically, the controller 14 operates to determine, based on the final target torque set in the step S6 and an engine speed, various state quantities (e.g., air charge amount, fuel injection amount, intake air temperature, and oxygen concentration) required for attaining the final target torque, and then control, based on the determined state quantities, actuators for driving the components of the engine 4. In this case, before performing the control, the controller 14 operates to set a limit value or range with respect to each of the state quantities, and set a control amount of each of the actuators to enable its related state value to preserve limitation by the limit value or range.

More specifically, when the engine 4 is a gasoline engine, the controller 14 operates to retard an ignition timing of the spark plug 28 with respect to a point to be set when the basic target torque is determined directly as the final target torque, thereby reducing the output torque of the engine 4.

On the other hand, when the engine 4 is a diesel engine, the controller 14 operates to reduce the fuel injection amount with respect to an amount to be set when the basic target torque is determined directly as the final target torque, thereby reducing the output torque of the engine 4.

After completion of the step S7, the controller 14 operates to complete one cycle of the vehicle attitude control processing routine.

Next, with reference to FIGS. 5 and 6, the target additional deceleration setting processing subroutine in this embodiment will be described.

Figure 5:
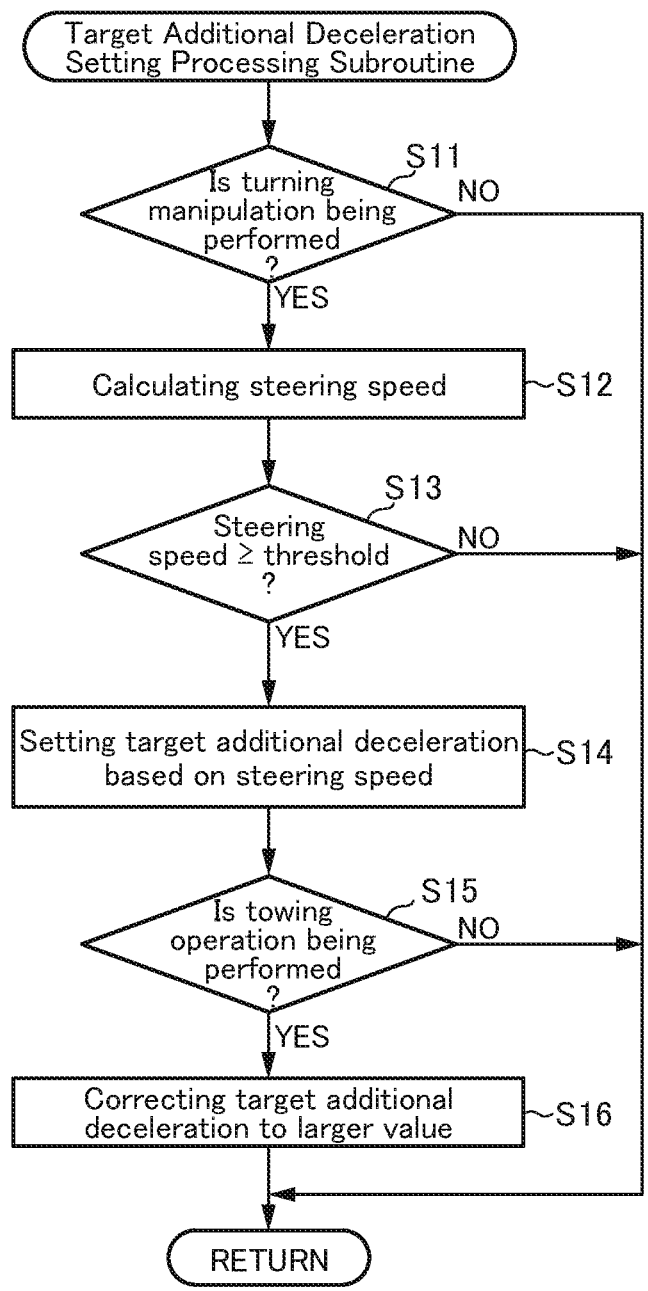
FIG. 5 is a flowchart of a target additional deceleration setting processing subroutine in this embodiment.
Figure 6:
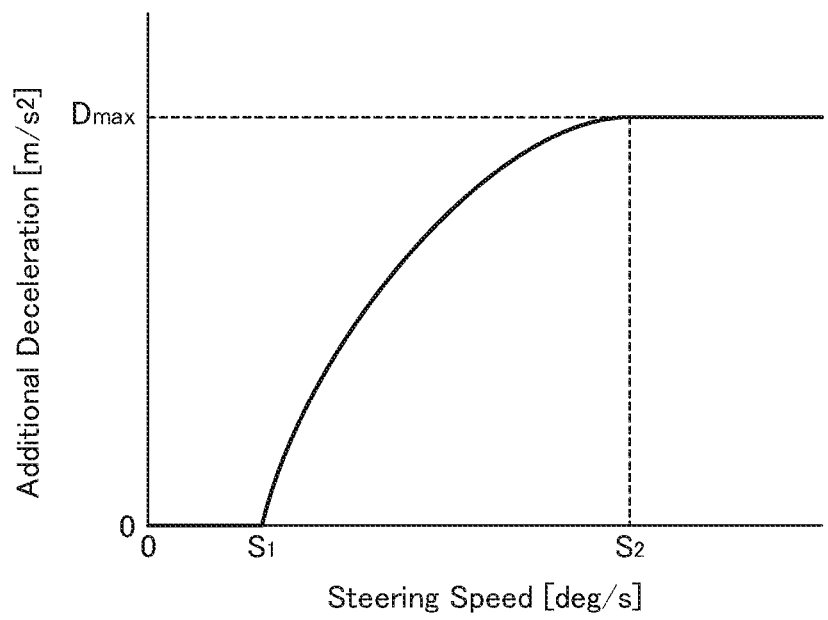
FIG. 6 is a map showing a relationship between an additional deceleration and a steering speed, in this embodiment.

FIG. 5 is a flowchart of the target additional deceleration setting processing subroutine in this embodiment, and FIG. 6 is a map showing a relationship between an additional deceleration and the steering speed in this embodiment.

Upon start of the target additional deceleration setting processing subroutine, the controller 14 operates, in step S11, to determine whether or not turning manipulation of the steering wheel 6 is being performed (i.e., the steering angle (absolute value) is increasing).

As a result, when the turning manipulation is determined to be being performed (step S11: YES), the subroutine proceeds to step S12 in which the controller 14 operates to calculate the steering speed based on the steering angle acquired from the steering angle sensor 8 in the step S1 in the vehicle attitude control processing routine of FIG. 4.

Subsequently, the controller 14 operates, in step S13, to determine whether or not the calculated steering speed is equal to or greater than a given threshold $S_1$. As a result, when the calculated steering speed is determined to be equal to or greater than the threshold $S_1$ (step S13: YES), the subroutine proceeds to step S14 in which the controller 14 operates to set a target additional deceleration based on the steering speed. This target additional deceleration is a deceleration to be added to the vehicle 1 according to the steering wheel manipulation, so as to control the vehicle behavior.

Specifically, the controller 14 operates to refer to a relationship between an additional deceleration and the steering speed illustrated by the map in FIG. 6 to set, as the target additional deceleration, a value of the additional deceleration corresponding to the steering speed calculated in the step S22.

In FIG. 6, the horizontal axis represents the steering speed, and the vertical axis represents the additional deceleration. As depicted in FIG. 6, when the steering speed is less than the threshold $S_1$, a corresponding value of the additional deceleration is 0. That is, when the steering speed is less than the threshold $S_1$, the controller 14 operates not to execute control of adding a deceleration to the vehicle 1 based on the steering wheel manipulation.

On the other hand, when the steering speed is equal to or greater than the threshold $S_1$, a value of the additional deceleration corresponding to the steering speed gradually comes closer to a given upper limit $D_{max}$. That is, along with an increase in the steering speed, the additional deceleration gradually increases, and an increase rate of the additional deceleration gradually decreases. This upper limit $D_{max}$ is set to a deceleration (e.g., 0.5 m/s$^2$≈0.05 G) which is small enough so that a driver does not feel intervention of the control even when the deceleration is added to the vehicle 1 according to the steering wheel manipulation.

Further, when the steering speed is equal to or greater than a threshold $S_2$ which is greater than the threshold $S_1$, the additional deceleration is maintained at the upper limit $D_{max}$.

Subsequently, the controller 14 operates, in step S15, to, based on: the acceleration acquired from the acceleration sensor 13 in the step S1 in the vehicle attitude control processing routine of FIG. 4; the target acceleration determined in the step S2; and the road grade, determine whether or not the vehicle 1 is in the trailer towing state. Specifically, the controller 14 operates to calculate a value (a target-actual acceleration difference) by subtracting an influence of an acceleration of gravity due to the road grade, from a difference between the target acceleration determined in the vehicle attitude control processing routine and an actual acceleration calculated from a temporal change in the vehicle speed. A relationship between the target acceleration and the basic target torque of the engine 4 is set based on a vehicle weight of the vehicle itself in the non-trailer towing state. Thus, when the vehicle 1 is in the trailer towing state, it is considered that the output torque of the engine 4 becomes insufficient with respect to the target acceleration, and thereby the actual acceleration becomes less than the target acceleration. Therefore, the controller 14 operates to, when the target-actual acceleration difference is equal to or greater than a given threshold, determine that the vehicle 1 is in the trailer towing state.

Alternatively, a tow switch 32 may be provided which is configured to be switched in an ON/OFF manner, depending on whether or not the vehicle 1 is in the trailer towing state, and it may be determined, based on an output of the tow switch, whether or not the vehicle 1 is in the trailer towing state.

Here, assume the situation where the vehicle 1 is determined, in the step S15, to be in the trailer towing state (step S15: YES), i.e., the vehicle 1 is determined to be in a state in which a vertical load is applied from the trailer to the rear end of the vehicle body through the hitch, and thus the rear end of the vehicle body squats down with respect to the front end of the vehicle body at a given level or more. In this situation, when adding a deceleration to the vehicle 1 in the vehicle attitude control to cause the front end of the vehicle body to squat down at the same level as that in the non-trailer towing state, the deceleration needs to be greater than that to be added in the non-trailer towing state. Thus, the controller 14 operates, in step S16, to correct the target additional deceleration (absolute value) set at the step S14, to a larger value. Subsequently, the controller 14 operates to complete the target additional deceleration setting processing subroutine, and return to the main routine.

On the other hand, when the turning manipulation is determined, in the steps S11, not to be being performed (step S11: NO), or when the calculated steering speed is determined, in the step S13, to be less greater than the threshold $S_1$ (step S13: NO), the controller 14 operates to complete the target additional deceleration setting processing subroutine without setting any target additional deceleration, and return to the main routine.

Further, when the vehicle 1 is determined, in the step S15, to be in the non-trailer towing state (step S15: NO), i.e., it is determined that no vertical load is applied from the trailer to the rear end of the vehicle body through the hitch, and thus the rear end of the vehicle body does not squat down with respect to the front end of the vehicle body at the given level or more, the controller 14 operates to complete the target additional deceleration setting processing subroutine without correcting the target additional deceleration, and return to the main routine.

Figure 7:
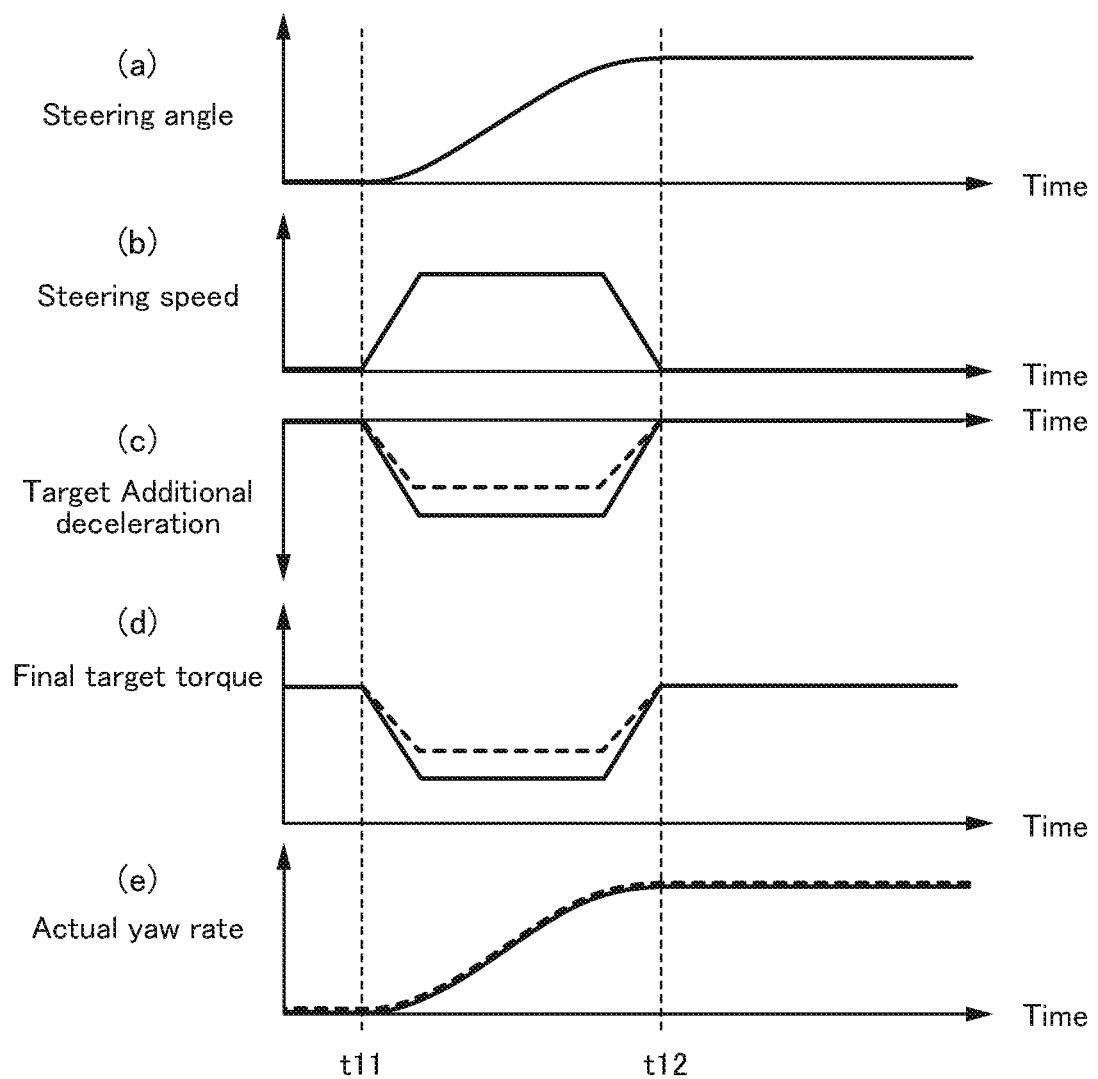
FIG. 7 illustrates time charts each showing a temporal change in a respective one of various parameters regarding vehicle attitude control, in a situation where a vehicle equipped with the vehicle control device according to this embodiment is turning.

Next, with reference to FIG. 7, the operation of the vehicle control device according to this embodiment will be described. FIG. 7 illustrates time charts each showing a temporal change in a respective one of various parameters regarding the vehicle attitude control, in a situation where the vehicle 1 equipped with the vehicle control device according to this embodiment is turning.

In FIG. 7, the chart (a) and the chart (b) represent, respectively, the steering angle and the steering speed, and the chart (c), the chart (d) and the chart (e) represent, respectively, the target additional deceleration, the final target torque, and an actual yaw rate. In the charts (c), (d) and (e), the solid line indicates a change in each parameter in the situation where the vehicle 1 is in the trailer towing state (in the situation where the rear end of the vehicle body squats down with respect to the front end of the vehicle body at a given level or more), and the broken line indicates a change in each parameter in the situation where the vehicle 1 is in the non-trailer towing state (in the situation where the rear end of the vehicle body does not squat down with respect to the front end of the vehicle body at the given level or more).

As shown in the chart (a), from time t11, turning manipulation of the steering wheel 6 is started. In this example, in a time period between the time t11 and time t12, the steering speed becomes equal to or greater than the threshold $S_1$ as shown in the chart (b), and thereby the target additional deceleration is set based on the steering speed as shown in the chart (c). Specifically, although the steering speed is the same between when the vehicle 1 is in the trailer towing state and when the vehicle 1 is in the non-trailer towing state, the target additional deceleration (absolute value) is increased when the vehicle 1 is in the trailer towing state, as compared to when the vehicle 1 is in the non-trailer towing state. This is because, in the target additional deceleration setting processing subroutine, the target additional deceleration (absolute value) is corrected to a larger value, when the vehicle 1 is in the trailer towing state. The final target torque is set according to such a target additional deceleration, as shown in the chart (d). Specifically, the final target torque becomes smaller (i.e., a reduction amount of the output torque of the engine 4 becomes larger) when the vehicle 1 is in the trailer towing state, than when the vehicle 1 is in the non-trailer towing state. Then, the engine 4 is controlled to generate the final target torque set in the above manner, so that the actual yaw rate is generated in the vehicle 1, as shown in the table (e). Specifically, approximate the same actual yaw rate is generated in the vehicle 1 between when the vehicle 1 is in the trailer towing state and when the vehicle 1 is in the non-trailer towing state.

As above, when the vehicle 1 is in the trailer towing state, the target additional deceleration (absolute value) is collected to a larger value in the target additional deceleration setting processing subroutine, to control the engine 4 to increase the reduction amount of the output torque, as compared to when the vehicle 1 is in the non-trailer towing state, so that a pitching moment oriented to cause the front end of the vehicle body to squat down when adding a deceleration to the vehicle 1 can be increased when the vehicle 1 is in the trailer towing state, as compared to when the vehicle 1 is in the non-trailer towing state. Thus, even in a situation where pitching of the vehicle body of the vehicle 1 is suppressed due to the vertical load applied from the trailer to the rear end of the vehicle body through the hitch, it is possible to overcome insufficient squat of the front end of the vehicle body when adding a deceleration to the vehicle 1 by the vehicle attitude control, thereby adequately ensuring vehicle turning performance. That is, it is possible to adequately generate the actual yaw rate in the vehicle 1 by the vehicle attitude control, irrespective of whether or not the vehicle 1 is in the trailer trailing state, as shown in the chart (e), thereby obtaining desired vehicle turning performance.

Function/Advantageous Effect

Next, the function/advantageous effect of the vehicle control device according to this embodiment will be described.

In this embodiment, the controller 14 operates to, in response to the determination that the turning manipulation of the steering device has been made, increase the reduction amount of the output torque of the engine 4, when the vehicle 1 is in the trailer towing state (a squat of the rear end of the vehicle body is equal to or greater than a given level), as compared to when the vehicle 1 is in the non-trailer towing state (the squat of the rear end of the vehicle body is less than the given level). Thus, in a situation where the rear end of the vehicle body squats down due to the weight of the trailer, and a squat of the front end of the vehicle body to be caused by generation of a deceleration is suppressed, it is possible to add a lager deceleration to the vehicle 1 to overcome the insufficient squat of the front end of the vehicle body, thereby adequately ensuring vehicle turning performance.
<Modifications>

Next, some modifications of the above embodiment will be described. In the following modified embodiments, descriptions about the same component and processing as those in the above embodiment will be appropriately omitted. That is, any component and processing which will not be described in the following modified embodiments are the same as those in the above embodiment.

(First Modification) In the above embodiment, when the turning manipulation of the steering device has been made, the output torque of the engine 4 is reduced to control the attitude of the vehicle 1. Alternatively, the vehicle control device may be configured to, when the turning manipulation of the steering device has been made, cause the brake units 16 to generate a braking force, thereby adding a target additional deceleration to the vehicle 1.

Figure 8:
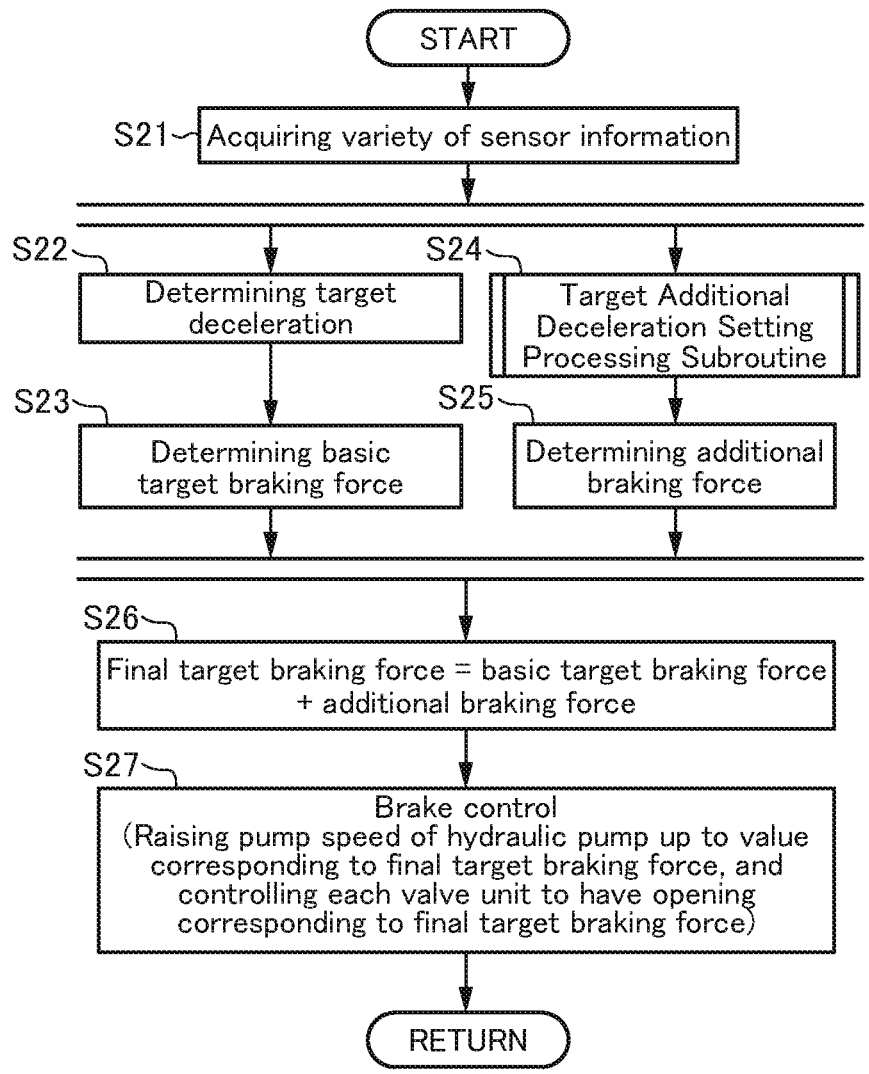
FIG. 8 is a flowchart of a vehicle attitude control processing routine in a vehicle control device according to a first modification of this embodiment.

First, with reference to FIG. 8, a vehicle attitude control processing routine in a vehicle control device according to a first modification of the above embodiment (first modified embodiment) will be described. FIG. 8 is a flowchart of the vehicle attitude control processing routine in the vehicle control device according to the first modified embodiment.

First of all, the controller 14 operates, in step S21, to acquire detection signals output from the various sensors, as information regarding the driving state of the vehicle 1. Then, the controller 14 operates, in step S22, to set, based on the driving state of the vehicle 1 acquired in the step S21, a target deceleration to be applied to the vehicle 1. Specifically, a deceleration map (not shown) in which the deceleration is defined with respect to the brake pedal depression amount, a brake pedal depression speed, and the vehicle speed is preliminarily stored in a memory or the like. The controller 14 operates to refer to the deceleration map to determine, as the target deceleration, a value of the deceleration corresponding to values of the brake pedal depression amount, the brake pedal depression speed and the vehicle speed acquired in the step S21.

Subsequently, the controller 14 operates, in step S23, to set a basic target braking force by each of the brake units 16 so as to attain the target deceleration set in the step S22.

In parallel to the processings in the steps S22 and S23, the controller 14 operates, in step S24, to execute a target additional deceleration setting processing subroutine (see FIG. 5) to set, based on the steering speed of the steering device, a deceleration to be added to the vehicle 1 to control vehicle attitude (target additional deceleration).

Next, the controller 14 operates, in step S25, to determine an additional braking force, based on a target additional deceleration set in the target additional deceleration setting processing subroutine in the step S24. Specifically, the controller 14 operates to determine, based on current values of the vehicle speed and the road grade, etc., acquired in the step S21, an additional braking force necessary to attain the target additional deceleration by means of application of a braking force.

After completion of the processings in the steps S23 and S25, the controller 14 operates, in step S26, to determine a final target braking force, based on the basic target braking force determined in the step S23 and the additional braking force determined in the step S25. For example, the controller 14 operates to set, as the final target braking force, a value obtained by adding the basic target braking force and the additional braking force.

Subsequently, in step S27, the controller 14 operates to control each of the brake units 16 to generate the final target braking force determined in the step S26. Specifically, the controller 14 operates to output a braking force instruction value to the brake control system 18, based on the final target braking force determined in the step S26.

For example, the brake control system 18 preliminarily stores therein a map defining a relationship between the braking force instruction value and the pump speed of the hydraulic pump 20. Then, in response to receiving the braking force instruction, the brake control system 18 operates to refer to the map to operate the hydraulic pump 20 at a value of the pump speed corresponding to the received braking force instruction value (e.g., electric power to be supplied to the hydraulic pump 20 is increased to raise the pump speed of the hydraulic pump 20 up to a value corresponding to the received braking force instruction value).

For example, the brake control system 18 also preliminarily stores therein a map defining a relationship between the braking force instruction value and the degree of opening of each of the valve units 22. Then, in response to receiving the braking force instruction value, the brake control system 18 operates to refer to the map to control each of the valve units 22 individually to have a value of the degree of opening corresponding to the received braking force instruction value (e.g., electric power to be supplied to the solenoid value is increased to increase the degree of opening of the solenoid valve to a value corresponding to the received braking force instruction value), thereby adjusting the braking force of each of the road wheels.

After completion of the step S27, the controller 14 operates to complete one cycle of the vehicle attitude control processing routine.

Figure 9:
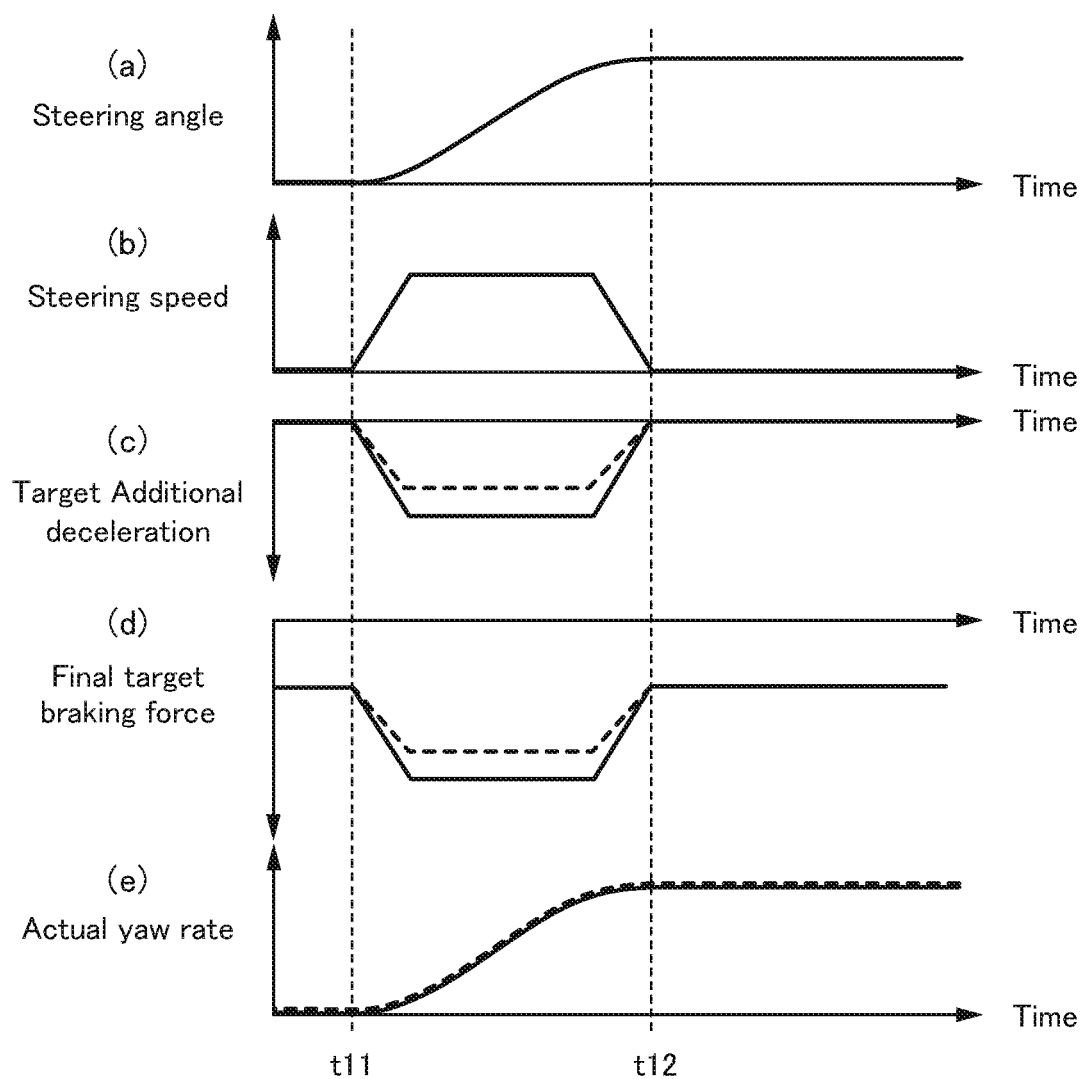
FIG. 9 illustrates time charts each showing a temporal change in a respective one of various parameters regarding the vehicle attitude control, in a situation where a vehicle equipped with the vehicle control device according to the first modified embodiment.

Next, with reference to FIG. 9, the operation of the vehicle control device according to the first modified embodiment will be described. FIG. 9 illustrates time charts each showing a temporal change in a respective one of various parameters regarding the vehicle attitude control, in a situation where a vehicle 1 equipped with the vehicle control device according to the first modified embodiment is turning.

In FIG. 9, the chart (a) and the chart (b) represent, respectively, the steering angle and the steering speed, and the chart (c), the chart (d) and the chart (e) represent, respectively, the target additional deceleration, the final target braking force, and the actual yaw rate. The charts (a) to (c) and (e) of FIG. 9 are identical, respectively, to the charts (a) to (c) and (e) of FIG. 7, and only the chart (d) of FIG. 9 is different from the chart (d) of FIG. 7.

Specifically, in the first modified embodiment, as shown in the chart (d), the final target braking force is set according to the target additional deceleration indicated in the chart (c). Specifically, the final target braking force (absolute value) is increased when the vehicle 1 is in the trailer towing state, as compared to when the vehicle 1 is in the non-trailer towing state. Then, the brake units 16 are controlled to generate the final target braking force set in the above manner, so that the actual yaw rate is generated in the vehicle 1, as shown in the table (e). Specifically, approximate the same actual yaw rate is generated in the vehicle 1 between when the vehicle 1 is in the trailer towing state and when the vehicle 1 is in the non-trailer towing state.

In the above first modified embodiment, even in a situation where the rear end of the vehicle body squats down due to the weight of the trailer, and thereby a squat of the front end of the vehicle body to be caused by generation of a deceleration is suppressed, it is possible to add a larger deceleration to overcome insufficient squat of the front end of the vehicle body, thereby adequately ensuring vehicle turning performance by the vehicle attitude control.

(Second Modification)

In the above embodiment, when the turning manipulation of the steering device has been made, the output torque of the engine 4 is reduced to control the attitude of the vehicle 1. Alternatively, the vehicle control device may be configured to, when the turning manipulation of the steering device has been made, cause a generator to perform regenerative power generation while being driven by road wheels, thereby adding a target additional deceleration to the vehicle 1.

Figure 10:
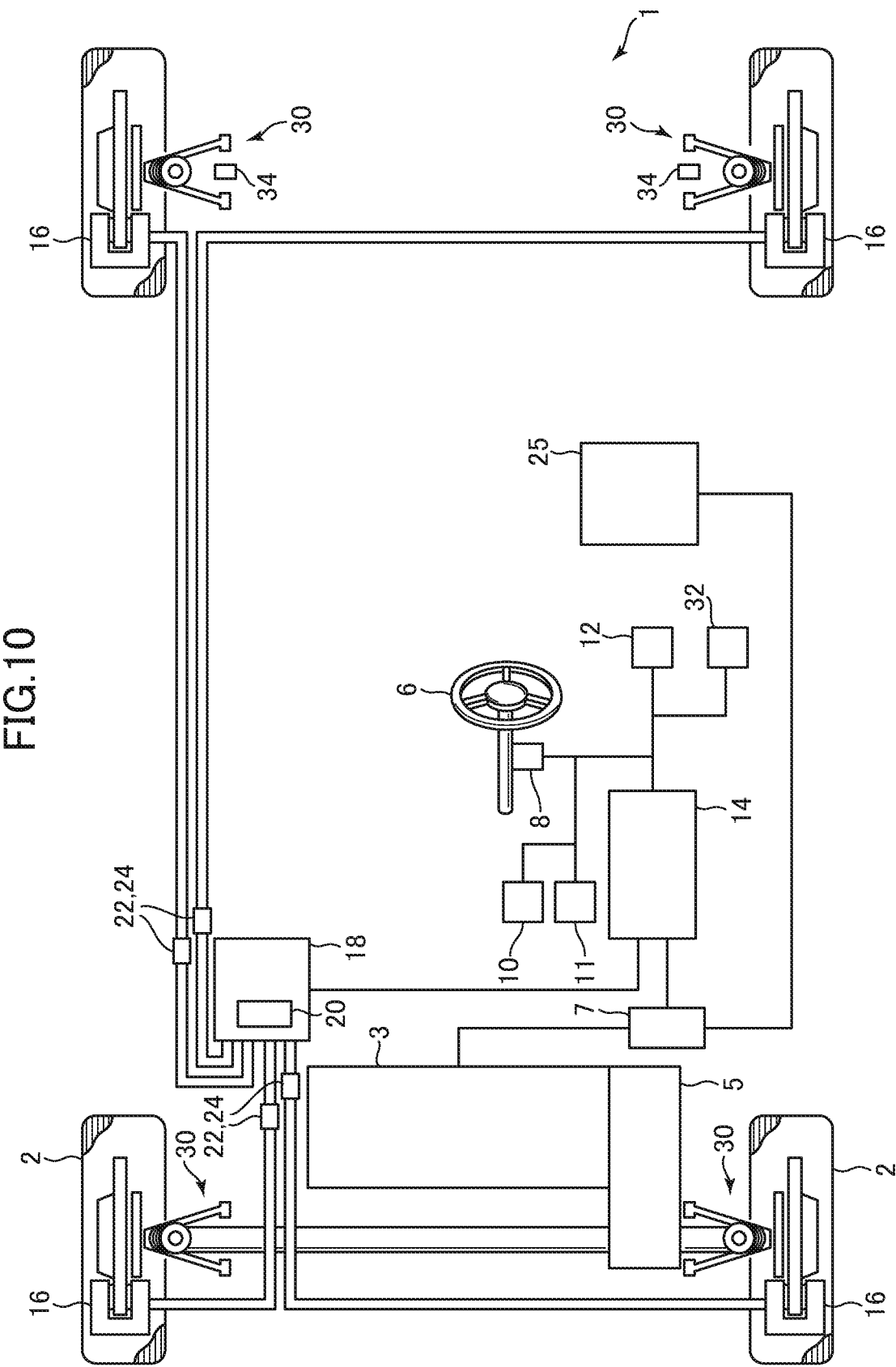
FIG. 10 is a block diagram showing the overall configuration of a vehicle equipped with a vehicle control device according to a second modification of this embodiment.

First, with reference to FIGS. 10 and 11, a system configuration of a vehicle equipped with a vehicle control device according to a second modification of the above embodiment (second modified embodiment) will be described. FIG. 10 is a block diagram showing the overall configuration of the vehicle equipped with the vehicle control device according to the second modified embodiment, and FIG. 11 is a block diagram showing an electrical configuration of the vehicle control device according to the second modified embodiment.

Figure 11:
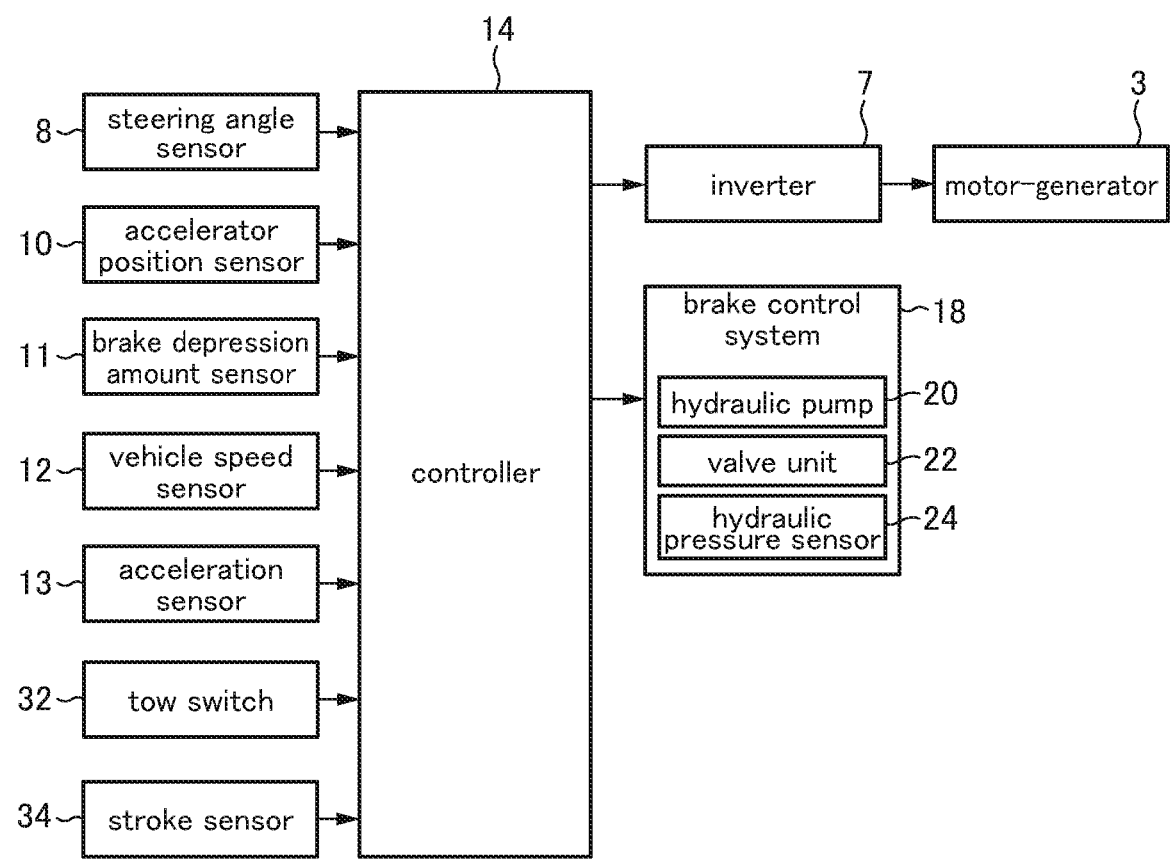
FIG. 11 is a block diagram showing an electrical configuration of the vehicle control device according to the second modified embodiment.

In the second modified embodiment, as shown in FIGS. 10 and 11, the vehicle 1 is equipped with a motor-generator 3 having a function of driving the front road wheels 2 (i.e., a function as an electric motor), and a function of performing regenerative power generation while being driven by the front road wheels 2 (i.e., a function as a generator). The motor-generator 3 is configured to transmit and receive a force with respect to the front road wheels 2 via a speed reducer 5, and to be controlled by the controller 14 via an inverter 7. Further, the motor-generator 3 is connected to a battery 25 via the inverter 7, and configured to, during generation of a driving force, receive electric power from the battery 25, and, after regenerating electric power, supply the regenerated electric power to the battery 25 to charge the battery 25.

The controller 14 operates to control the motor-generator 3 and the brake control system 18, based on detection signals output from the various sensors each to detect the driving state of the vehicle 1. Specifically, when driving the vehicle 1, the controller 14 operates to calculate a target torque (driving torque) to be applied to the vehicle 1, and output a control signal to the inverter 7 so as to cause the motor-generator 3 to generate the target torque. On the other hand, when braking the vehicle 1, the controller 14 operates to calculate a target regenerative torque to be applied to the vehicle 1, and output a control signal to the inverter 7 so as to cause the motor-generator 3 to generate the target regenerative torque. Alternatively, when braking the vehicle 1, the controller 14 may be configured to calculate a target braking force to be applied to the vehicle 1, in place of or in addition to the regenerative torque, and output a control signal to the brake control system 18 so as to attain the target braking force. In this case, the controller 14 operates to control the hydraulic pump 20 and the valve units 22 of the brake control system 18, thereby causing the brake units 16 to generate a desired braking force.

Next, with reference to FIG. 12, a vehicle attitude control processing routine in the vehicle control device according to the second modified modification will be described. FIG. 12 is a flowchart of the vehicle attitude control processing routine in the second modified embodiment.

As shown in FIG. 12, the controller 14 operates, in step S31, to acquire detection signals output from the various sensors, as information regarding the driving state of the vehicle 1. Then, the controller 14 operates, in step S32, to set, based on the driving state of the vehicle 1 acquired in the step S31, a target acceleration or a target deceleration to be applied to the vehicle 1. Specifically, the controller 14 operates to set the target acceleration or the target deceleration, based on the accelerator depression amount, the brake pedal depression amount, the vehicle speed, etc.

Subsequently, the controller 14 operates, in step S33, to, when the target acceleration is set in the step S32, set a basic target torque of the motor-generator 3 required for attaining the target acceleration, or to when the target deceleration is set in the step S32, set a basic target regenerative torque of the motor-generator 3 required for attaining the target deceleration.

In parallel to the processings in the steps S32 and S33, the controller 14 operates, in step S34, to execute a target additional deceleration setting processing subroutine (see FIG. 5) to set, based on the steering speed of the steering device, a deceleration to be added to the vehicle 1 to control vehicle attitude (target additional deceleration).

Next, the controller 14 operates, in step S35, to determine a torque reduction amount, based on a target additional deceleration set in the target additional deceleration setting processing subroutine in the step S34. Specifically, the controller 14 operates to determine, based on current values of the vehicle speed and the road grade, a currently-set one of the gear stages, etc., acquired in the step S31, a torque reduction amount necessary to attain the target additional deceleration by means of reduction of the output torque of the motor-generator 3 or increase of the regenerative torque.

Subsequently, the controller 14 operates, in step S36, to determine whether or not the vehicle 1 is driven, i.e., whether or not the vehicle 1 is not braked. In one example, the controller 14 operates to, when the basic target torque is set in the step S33 (i.e., when the target acceleration is set in the step S32), determine that the vehicle 1 is driven, or to, when the basic target regenerative torque is set in the step S33 (i.e., when the target deceleration is set in the step S32), determine that the vehicle 1 is not driven. In another example, the controller 14 operates to perform the determination, based on detection signals from the accelerator position sensor 10 and the brake depression amount sensor 11, When the vehicle 1 is determined, in the step S36, to be driven (step S36: YES), the controller 14 operates, in step S37, to determine a final target torque, based on the basic target torque set in the step S33, and the torque reduction amount set in the step S35. Specifically, the controller 14 operates to set, as the final target torque, a value obtained by subtracting the torque reduction amount from the basic target torque. That is, the controller 14 operates to reduce a driving torque to be applied to the vehicle 1. Here, when no target additional deceleration is set in the step S34 (i.e., when the torque reduction amount is 0), the controller 14 operates to set the basic target torque directly as the final target torque.

Subsequently, the controller 14 operates, in step S38, to set an instruction value for the inverter 7 (inverter instruction value) to attain the final target torque determined in the step S37. That is, the controller 14 operates to set the inverter instruction value (control signal) to cause the motor-generator 3 to generate the final target torque. Then, the controller 14 operates, in the step S39, to output, to the inverter 7, the inverter instruction value set in the step S38. After completion of the step S39, the controller 14 operates to complete one cycle of the vehicle attitude control processing routine.

On the other hand, when the vehicle 1 is determined, in the step S36, not to be driven (step S36: NO), i.e., when the vehicle 1 is determined, in the step S36, to be braked, the controller 14 operates, in step S40, to determine a final target regenerative torque, based on the basic target regenerative torque set in the step S33, and the torque reduction amount set in the step S35. Specifically, the controller 14 operates to set, as the final target regenerative torque, a value obtained by adding the torque reduction amount to the basic target regenerative torque (in principle, each of the basic target regenerative torque and the torque reduction amount is expressed as a positive value). That is, the controller 14 operates to increase a regenerative torque (braking torque) to be applied to the vehicle 1. Here, when no target additional deceleration is set in the step S34 (i.e., when the torque reduction amount is 0), the controller 14 operates to set the basic target regenerative torque directly as the final target regenerative torque.

Subsequently, the controller 14 operates, in step S41, to set an instruction value for the inverter 7 (inverter instruction value) to attain the final target regenerative torque determined in the step S40. That is, the controller 14 operates to set the inverter instruction value (control signal) to cause the motor-generator 3 to generate the final target regenerative torque. Then, the controller 14 operates, in the step S39, to output, to the inverter 7, the inverter instruction value set in the step S41. After completion of the step S39, the controller 14 operates to complete one cycle of the vehicle attitude control processing routine.

Next, with reference to FIG. 13, the operation of the vehicle control device according to the second modified embodiment will be described. FIG. 13 illustrates time charts each showing a temporal change in a respective one of various parameters regarding the vehicle attitude control, in a situation where a vehicle equipped with the vehicle control device according to the second modified embodiment is turning, wherein the vehicle 1 is not driven (i.e., the step S36 in FIG. 14: NO).

In FIG. 13, the chart (a) and the chart (b) represent, respectively, the steering angle and the steering speed, and the chart (c), the chart (d) and the chart (e) represent, respectively, the target additional deceleration, the final target regenerative torque, and the actual yaw rate. The charts (a) to (c) and (e) of FIG. 13 are identical, respectively, to the charts (a) to (c) and (e) of FIG. 7, and only the chart (d) of FIG. 13 is different from the chart (d) of FIG. 7.

Specifically, in the second modified embodiment, as shown in the chart (d), the final target regenerative torque is set according to the target additional deceleration indicated in the chart (c). Specifically, the final target regenerative torque is increased when the vehicle 1 is in the trailer towing state, as compared to when the vehicle 1 is in the non-trailer towing state. Then, the motor-generator 3 is controlled to generate the final target regenerative torque set in the above manner, so that the actual yaw rate is generated in the vehicle 1, as shown in the table (e). Specifically, approximate the same actual yaw rate is generated in the vehicle 1 between when the vehicle 1 is in the trailer towing state and when the vehicle 1 is in the non-trailer towing state.

In the above second modified embodiment, even in a situation where the rear end of the vehicle body squats down due to the weight of the trailer, and thereby a squat of the front end of the vehicle body to be caused by generation of a deceleration is suppressed, it is possible to add a larger deceleration to overcome insufficient squat of the front end of the vehicle body, thereby adequately ensuring vehicle turning performance by the vehicle attitude control.

(Other Modifications)

As a specific example of a criterion for allowing the controller 14 to determine that the squat of the rear end of the vehicle body is at a given level or more, the above embodiment shows one example where, when the vehicle 1 is in the trailer towing state, the controller 14 determines that the squat of the rear end of the vehicle body is at the given level or more. Alternatively, any other criterion may be used to determine that the squat of the rear end of the vehicle body is at the given level or more For example, the controller 14 may be configured to acquire a load at the rear end of the vehicle body, and, when the load is equal to or greater than a given value, determine that the squat of the rear end of the vehicle body is equal to or greater than the given level. The load at the rear end of the vehicle body can be detected, based on, e.g., the acceleration acquired from the acceleration sensor 13, the target acceleration determined in the vehicle attitude control processing routine, and the road grade. Specifically, the controller 14 operates to calculate a value (a target-actual acceleration difference) by subtracting an influence of an acceleration of gravity due to the road grade, from a difference between the target acceleration and an actual acceleration calculated from a temporal change in the vehicle speed. A relationship between the target acceleration and the basic target torque of the engine 4 is set based on the weight of the vehicle in a state in which no heavy object is loaded on the rear end of the vehicle body. Thus, when a heavy object is loaded on the rear end of the vehicle body, it is considered that the output torque of the engine 4 or the motor-generator 3 becomes insufficient with respect to the target acceleration, and thereby the actual acceleration becomes less than the target acceleration. Therefore, the controller 14 operates to, when the target-actual acceleration difference is equal to or greater than a given threshold, determine that a load at the rear end of the vehicle body is equal to or greater than a given value, i.e., the squat of the rear end of the vehicle body is at the given level or more.

Alternatively, a stroke sensor 34 may be provided, as a squat detection device, to detect a stroke amount of a rear suspension 30, and it may be determined, based on a detection value of the stroke sensor 34, whether or not the squat of the rear end of the vehicle body is at the given level or more.

Further, the above embodiment has been described based on an example where the rotational rotational angle of the steering shaft coupled to the steering wheel 6 is used as the steering angle. Alternatively, in place of or in addition to the rotational rotational angle of the steering shaft, any of various other state quantities (a rotational angle of a motor for applying an assist torque, a displacement of a rack of a rack-and-pinion, etc.) in a steering system may be used as the steering angle.

LIST OF REFERENCE SIGNS

1: vehicle
2: front road wheel
4: engine
6: steering wheel
8: steering angle sensor
10: accelerator position sensor
11: brake depression amount sensor
12: vehicle speed sensor
13: acceleration sensor
14: controller
16: brake unit
18: brake control system
3: motor-generator
30: suspension
32: tow switch
34: stroke sensor
A: towing vehicle
B: trailer

The invention claimed is:

1. A vehicle system for controlling a vehicle, comprising: a drive source to generate an output torque for driving drive road wheels; an output torque control mechanism to control the output torque of the drive source; a steering angle sensor to detect a steering angle of a steering device; a suspension device having an elastic member; and a processor, wherein the processor is configured to:

determine whether or not a squat of a rear end of a vehicle body of the vehicle is equal to or greater than a given level;

determine whether or not turning manipulation of the steering device has been performed, based on the steering angle detected by the steering angle sensor; and control the output torque control mechanism to reduce the output torque of the drive source, when the turning manipulation of the steering device is determined to have been performed, wherein, when the squat of the rear end of the vehicle body is equal to or greater than the given level, the processor is further configured to make a reduction amount of the output torque larger than when the squat is less than the given level.

2. The vehicle system according to claim 1, wherein the processor is configured to determine that the squat of the rear end is equal to or greater than the given level, when it is detected that the vehicle is performing towing.

3. The vehicle system according to claim 1, wherein the processor is configured to determine that the squat of the rear end is equal to or greater than the given level, when a load at the rear end of the vehicle body is equal to or greater than a given value.

4. A vehicle system for controlling a vehicle, comprising: a braking device to apply a braking force to road wheels; a steering angle sensor to detect a steering angle of a steering device; a suspension device having an elastic member; and a processor, wherein the processor is configured to:

determine whether or not a squat of a rear end of a vehicle body of the vehicle is equal to or greater than a given level;

determine whether or not turning manipulation of the steering device has been performed, based on the steering angle detected by the steering angle sensor; and cause the braking device to generate the braking force, when the turning manipulation of the steering device is determined to have been performed, wherein, when the squat of the rear end of the vehicle body is equal to or greater than the given level, the processor is further configured to make the braking force larger than when the squat is less than the given level.

5. The vehicle system according to claim 4, wherein the processor is configured to determine that the squat of the rear end is equal to or greater than the given level, when it is detected that the vehicle is performing towing.

6. The vehicle system according to claim 4, wherein the processor is configured to determine that the squat of the rear end is equal to or greater than the given level, when a load at the rear end of the vehicle body is equal to or greater than a given value.

7. A vehicle system for controlling a vehicle, comprising: a generator to perform regenerative power generation while being driven by road wheels; a steering angle sensor to detect a steering angle of a steering device; a suspension device having an elastic member: and a processor, wherein the processor is configured to:
- determine whether or not a squat of a rear end of a vehicle body of the vehicle is equal to or greater than a given level;
- determine whether or not turning manipulation of the steering device has been performed, based on the steering angle detected by the steering angle sensor; and
- cause the generator to perform the regenerative power generation, when the turning manipulation of the steering device is determined to have been performed,
- wherein, when the squat of the rear end of the vehicle body is equal to or greater than the given level, the processor is further configured to make an amount of regenerative power larger than when the squat is less than the given level.

8. The vehicle system according to claim 7, wherein the processor is configured to determine that the squat of the rear end is equal to or greater than the given level, when it is detected that the vehicle is performing towing.

9. The vehicle system according to claim 7, wherein the processor is configured to determine that the squat of the rear end is equal to or greater than the given level, when a load at the rear end of the vehicle body is equal to or greater than a given value.

* * * * *